9/6/83 XR 4,402,223

United States Patent [19]

[11] 4,402,223

[45] Sep. 6, 1983

Naumann, Jr. et al.

[54] ULTRASONIC SECTOR SCANNER UTILIZING ROTATING TRANSDUCER

[75] Inventors: Ted F. Naumann, Jr., Shingle Springs; Ronald C. Carnes, Folsom; Axel F. Brisken, Shingle Springs, all of Calif.

[73] Assignee: General Electric Company, Rancho Cordova, Calif.

[21] Appl. No.: 290,830

[22] Filed: Aug. 7, 1981

[51] Int. Cl.³ .......... G01N 29/00

[52] U.S. Cl. .......... 73/625; 73/628; 73/641

[58] Field of Search .......... 128/660; 73/625, 628, 73/641

[56] References Cited

U.S. PATENT DOCUMENTS

| | | | |
|---|---|---|---|
| 4,102,204 | 7/1978 | Kretz | 73/641 |
| 4,143,554 | 3/1979 | Nagy et al. | 73/641 |
| 4,185,501 | 1/1980 | Proudian et al. | 73/641 |
| 4,315,435 | 2/1982 | Proudian | 73/641 |

*Primary Examiner*—Howard A. Birmiel
*Attorney, Agent, or Firm*—Flehr, Hohbach, Test, Albritton & Herbert

[57] ABSTRACT

An ultrasonic sector scanner using rotating transducers includes a transducer support wheel having a circumferential rim surface with a plurality of recessed seats within the circumferential surface for receiving inwardly facing transducers. The wheel and recessed seats provide accurate alignment of the transducers and acoustic mirrors direct ultrasonic energy between the transducers and ports.

8 Claims, 7 Drawing Figures

ULTRASONIC SECTOR SCANNER UTILIZING ROTATING TRANSDUCER

This invention relates generally to ultrasonic scanners such as used for medical diagnostic purposes, and more particularly the invention relates to an ultrasonic sector scanner in which a plurality of rotating transducers are selectively energized for scanning.

Ultrasonic diagnostic systems are known and commercially available for diagnostic purposes. See for example U.S. Pat. No. 4,172,386 for "Video A Trace Display System For Ultrasonic Diagnostic System" and U.S. Pat. No. 4,204,433 for "Computerized Ultrasonic Scanner With Technique Select". The commercially available Datason ultrasound system of General Electric Company provides both real time and static images on a television video monitor.

Briefly, such systems utilize sound transducers to transmit ultrasonic waves (e.g. on the order of several megahertz) into a patient and to receive echo signals. In one mode of operation, the transducer is attached to a plurality of hinged arms for movement in a single plane, and potentiometers associated with the hinged arms produce signals which identify the transducer position and orientation. Alternatively, hand held multielement electronically steered arrays or hand held mechanically steered scanners can be used. The echo signals are applied to a time gain compensated amplifier to adjust the echo signals for attenuation in passing through the patient. The adjusted signals are then passed through an analog to digital conversion and video processing circuitry and thence to scan converter circuitry for display formatting. The display comprises a plurality of pixels in horizontal rows and vertical columns with each pixel having a brightness level in response to the input signal. Conventionally, the brightness is defined by a 32 level Gray-scale, hence the pixel brightness level requires a five bit digital code.

The hand held unit may be designed to display images in a sector format. Such a sector scanner may be a phased transducer array, an oscillating transducer, or a rotating transducer or transducer set. The phased array offers a high sample rate but its electronics are more expensive than those for mechanical designs. The oscillating transducer is a simple design and relatively compact. However, oscillating transducers have previously been designed with variable speeds yielding uneven display line spacings and have typically had narrow sector displays. The rotating transducer offers uniform transducer speed and a wider sector angle than does the oscillating transducer. However, a single transducer will yield low image frame rates and a probe with a set of transducers must have them accurately positioned and rigidly supported to provide identical beam alignment and attenuated sensitivity.

Accordingly, an object of the present invention is an improved sector scanner utilizing a rotating set of transducers.

Another object of the invention is a rotatable mechanical support for a plurality of transducers which provides accurate positioning and a rigid support.

A feature of the invention is a rotatable wheel support having a circumferential rim surface. A plurality of recessed seats are provided in the circumferential surface for receiving the transducers. Each seat has a central opening for transmission of ultrasonic energy to and from the transducer mounted therein and facing inwardly.

An ultrasonic sector scanner including the invention comprises a housing, a shaft rotatably mounted in the housing, and a motor mounted within the housing and coupled to rotate the shaft. A transducer support wheel is coupled to the shaft for rotating a plurality of transducers which are mounted in the recessed seats in the circumferential rim of the wheel.

In a preferred embodiment each transducer is generally rectangular in shape, and each seat is generally rectangular for receiving the transducer with each corner of the seat having a support tab for supportably receiving the transducer. The transducers face inwardly, and acoustic mirrors mounted in the housing direct acoustical waves between the transducers and ultrasonic ports in the housing.

In accordance with another feature of the invention the transducer support wheel includes a central hub portion for mounting to the shaft and a plurality of spokes extend from the hub to the rim surface. Each recessed seat has associated therewith a spoke, and electrical conductive means is provided on each spoke associated with the seat for electrically contacting a transducer in the seat.

The invention and objects and features thereof will be more readily apparent from the following detailed description and appended claims when taken with the drawing, in which:

Figure 1:
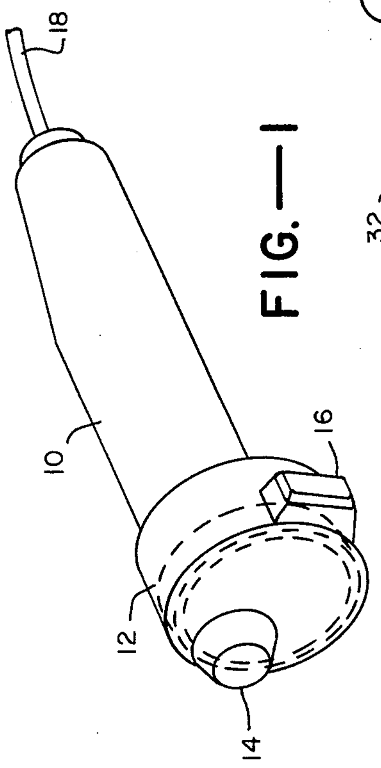
FIG. 1 is a perspective view of an ultrasonic sector scanner.

Referring now to the drawings, FIG. 1 is a perspective view of an ultrasonic sector scanner which includes a housing 10 of suitable configuration for manual support by an operator. Housing 10 is enlarged at the end portion 12 to accommodate a rotating transducer assembly as will be described further hereinbelow. Ports 14 and 16 provide for the transmission of ultrasonic energy from the transducers within the housing portion 12 and a patient undergoing examination. Signals received by the transducers are passed through internal electronics within housing 10 and through cable 18 to external signal processing means (now shown) for processing and display (further herein referred to as the system).

Figure 2:
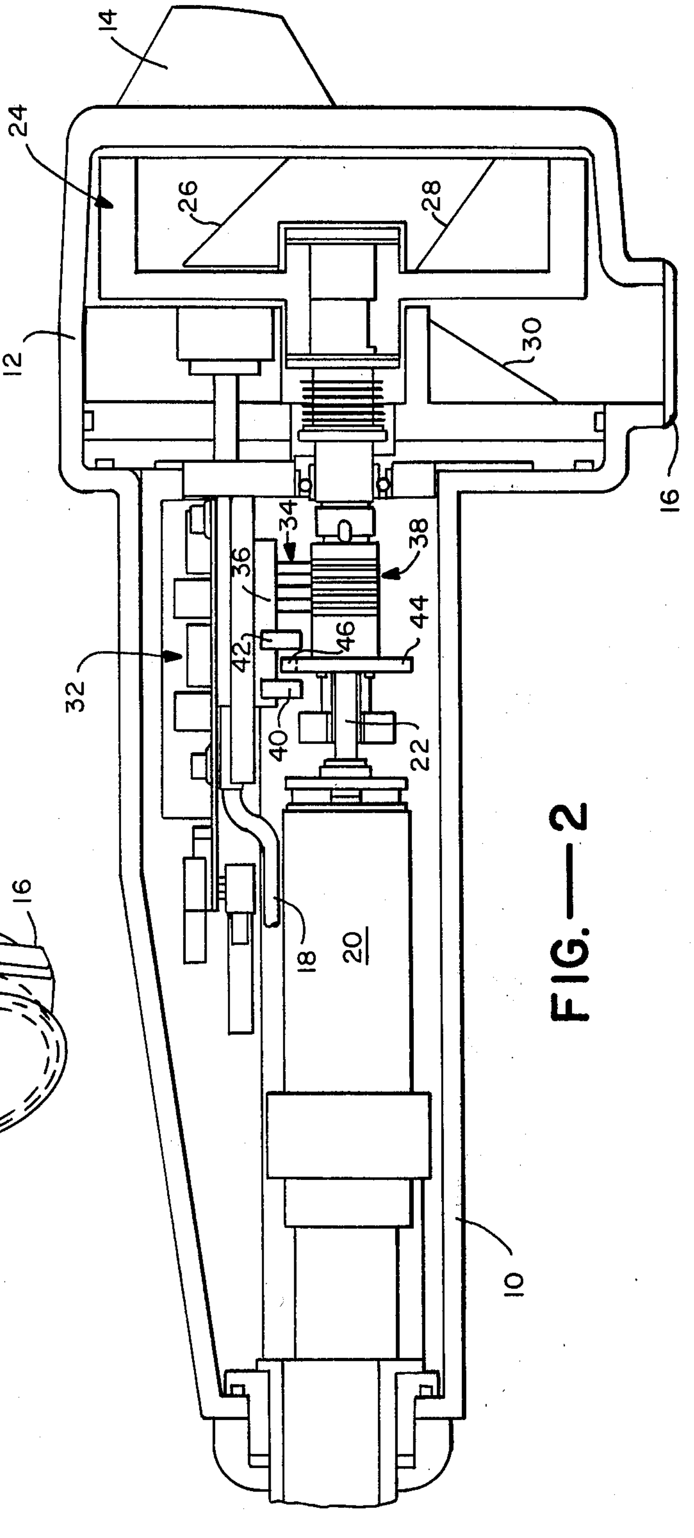
FIG. 2 is a section view of the sector scanner of FIG. 1 in accordance with one embodiment of the present invention.

FIG. 2 is a section view of the sector scanner of FIG. 1 in accordance with the present invention. Mounted within housing 10 is an electric motor 20 which rotates a hollow shaft 22. Rotatably mounted on shaft 22 within the housing portion 12 is a transducer assembly shown generally at 24. The transducer assembly includes a plurality of transducers (e.g. four) which are selectively actuated to transmit and receive ultrasonic energy either through port 14 through use of acoustic mirror 26 or through port 16 through use of acoustic mirrors 28 and 30, as determined by the ultrasonographer. The mirrors are fixedly positioned on the housing for transmission of the acoustic energy from the transducers in proper-time sequence.

Connected to the cable 18 is an electronic assembly shown generally at 32 for controlling and processing electrical signals to and from the transducer set. The electronic circuitry 32 is electrically interconnected with the transducer set by means of a plurality of brushes shown generally at 34 which are mounted in a brush block assembly 36 and which electrically and physically engage slip-rings 38 mounted on the rotating shaft 22. Conductive cable within the shaft 22 electrically interconnects the slip-rings 38 and the transducers, and conductive means interconnect the brushes 34 and the circuitry 32.

An indexing signal for identifying the position of the transducer assembly 24 is provided to the system electronic control circuitry by electro-optical means including an optical transmitter 40 and an optical detector 42 which are mounted in space alignment in the brush block assembly 36. Mounted on shaft 22 is an indexing wheel 44 the periphery of which passes between the electro-optical transmitter 40 and detector 42. A notch 46 is provided in a peripheral portion of the disc 44 whereby the transmission of light through the notch from transmitter 40 to detector 42 causes detector 42 to generate an electrical signal which is transmitted to the system. Thus, by physically positioning the disc 44 and notch 46 on shaft 22 in proper alignment with the transducer assembly 24, the indexing signal from optical detector 42 provides a necessary timing reference for the system. The brush and slip-ring assembly along with the indexing disc are further described in copending application Ser. No. 290,838, filed Aug. 7, 1981.

Figure 3:
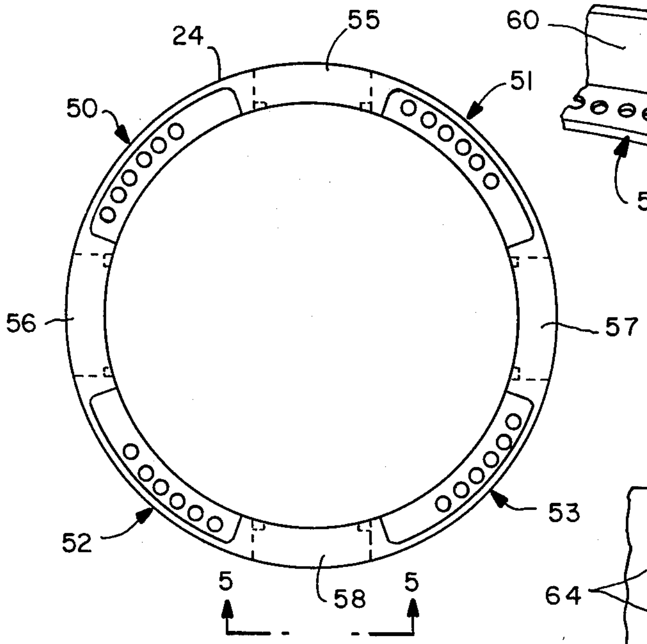
FIG. 3 is a plan view of a transducer support wheel in accordance with the invention as used in the sector scanner of FIG. 2.

FIGS. 3–7 further illustrate the transducer support wheel in the section scanner in accordance with the invention. FIG. 3 is a plan view of the transducer support wheel 24 with the hub portion removed therefrom. As will be described hereinbelow with reference to FIG. 6, a hub and spoke assembly is adhesively fastened to the transducer support wheel 24. The wheel 24 includes 4 recessed seats 55–58 which receive transducers. The plurality of holes shown generally at 50, 51, 52 and 53 allow electrical wiring of transducer elements and tuning components through the rim to the printed circuit on the spoke assembly.

Figure 4:
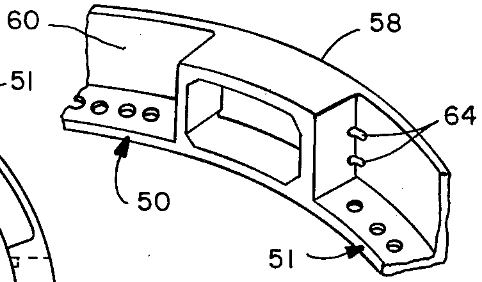
FIG. 4 is a perspective view of a transducer receiving seat as viewed along the line 5—5 of FIG. 3.
Figure 5:
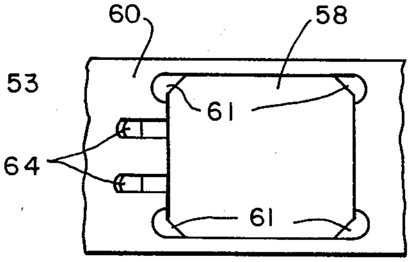
FIG. 5 is a top view of a transducer receiving seat as viewed along the line 5—5 of FIG. 3.

FIG. 4 is a perspective view of a portion of the wheel 24 further illustrating one of the recessed seats 58 looking from within the wheel, and FIG. 5 is a plan view of the seat 58 looking from outside of the wheel along the line 5—5 of FIG. 3. The wheel 24 has an outer rim surface 60 in which the seat 58 is formed for receiving the rectangular shaped planar transducer. Each corner of the rectangularly shaped recessed seat 58 includes a support tab 61 which receives a corner of the transducer.

The transducer is maintained in place by a suitable epoxy. Electrical wires interconnecting the transducer with the electronic circuitry pass through the holes 64 at the periphery of the transducer seat.

Figure 6:
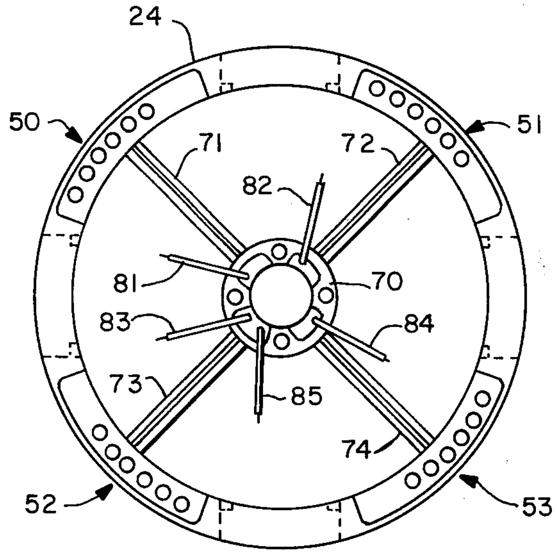
FIG. 6 is a side view of the transducer wheel of FIG. 3 with a hub assembly for mounting the wheel to the rotating shaft of a sector scanner.

FIG. 6 is a plan view of the transducer support wheel 24 with the hub 70 and spokes 71–74. The spokes 71–74 are part of a printed wire board which overlays the hub 70 and rim 24 and which is adhesively bonded to the same. Printed wiring provided on opposing surfaces of each spoke are interconnected to the transducers and to tuning elements through holes 50, 51, 52 and 53 and to the transducer again through the holes 64 as shown on FIGS. 3, 4 and 5. One side of each spoke is ground and the other side carries the appropriate ultrasonic signal. At the hub end of each spoke 71–74 electrical wiring 81–84 connect the transducer signals through the slip-rings 38 and brushes 34 (FIG. 2) to the electronic circuitry 32. A fifth wire 85 connects the ground terminal of each transducer to the ground of circuit 32.

Figure 7:
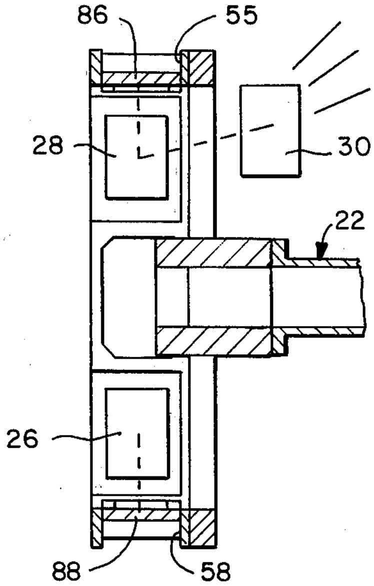
FIG. 7 is a side view in section of the support wheel and hub assembly of FIG. 6 as mounted to the end portion of a shaft.

FIG. 7 is a side view in section of the wheel and hub assembly mounted on the shaft 22 with transducers 86 and 88 positioned in the recessed seats 55 and 58 of the wheel. The transducers 86 and 88 face inwardly with acoustic energy being transmitted between the transducers and the ports 14 and 16 shown in FIG. 2 through the acoustic mirrors 26, 28 and 30, respectively, as previously described.

The transducer support wheel in accordance with the present invention provides accurate alignment of the transducers in the sector scanner and rigidly support the transducers during operation. Thus, identical beam alignment is realized from each of the transducers selected for a single wheel because of their identical attenuated sensitivity.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. An ultrasonic sector scanner comprising
- a housing,
- a shaft rotatably mounted in said housing,
- a motor mounted within said housing and coupled relative to said shaft,
- a transducer support wheel coupled to said shaft for rotating a plurality of generally rectangular transducers, said wheel having a circumferential rim surface, a plurality of recessed seats within said circumferential surface for receiving transducers inserted radially inwardly with respect to said wheel, each seat having a central opening in the radially inward direction, for transmitting ultrasonic energy to and from a transducer mounted in the seat, each corner of said seat having a support tab on the radially inward side thereof for receiving a surface of said transducer facing said central opening, and
- a plurality of transducers mounted in said seats.

2. An ultrasonic sector scanner as defined by claim 1 wherein said transducers as mounted in said seats face inwardly, and further including at least one ultrasonic port in said housing for the transmission of ultrasonic energy, and acoustic mirrors mounted in said housing for directing acoustic waves between said transducers and said port.

3. An ultrasonic sector scanner as defined by claim 2 wherein said transducer support wheel includes a central hub portion for mounting to said shaft and a plurality of spokes extending from said hub to said rim surface, each recessed seat having associated therewith a spoke, and electrical conductor means on each spoke electrically contacting a transducer in an associated seat.

4. An ultrasonic sector scanner as defined by claim 3 wherein said conductor means comprises printed conductors on each side of a spoke.

5. An ultrasonic sector scanner as defined by claim 3 wherein said shaft is hollow and further including electronic circuitry for processing electrical signals from said transducers, and conductive means within said shaft for electrically connecting said transducers and said electronic circuitry.

6. For use in an ultrasonic sector scanner, a transducer support wheel for rotating a plurality of transducers, said wheel including a circumferential rim surface, and a plurality of generally rectangular recessed seats within said circumferential surface for receiving transducers inserted radially inwardly with respect to said wheel, each seat having a central opening in the radially inward direction for transmitting ultrasonic energy to and from a transducer mounted in the seat, each corner of said seat having a support tab on the radially inward side for supporting a surface of said transducer facing a central opening.

7. A transducer support wheel as defined by claim 6 and further including a central hub portion for mounting said wheel to a shaft, and a plurality of spokes extending from said hub to said rim surface, each recessed seat having associated therewith a spoke, and electrical conductor means on each spoke associated with a seat for electrically contacting a transducer in said seat.

8. An ultrasonic sector scanner as defined by claim 7 wherein said conductor means comprises printed conductors on each side of a spoke.

* * * * *